United States Patent [19]

Recasens et al.

[11] 4,106,947
[45] Aug. 15, 1978

[54] BEADS OF CERAMIC MATERIAL

[75] Inventors: Joseph Recasens, Sorgues; André Penez, Courthezon, both of France

[73] Assignee: Societe Europeenne des Produits Refractaires, Neuilly-sur-Seine, France

[21] Appl. No.: 710,332

[22] Filed: Jul. 30, 1976

[30] Foreign Application Priority Data

Aug. 6, 1975 [FR] France .................................. 75 24527

[51] Int. Cl.$^2$ ................................................ C04B 35/48
[52] U.S. Cl. ............................................................ 106/57
[58] Field of Search ............................................. 106/57

[56] References Cited
U.S. PATENT DOCUMENTS 3,632,359  1/1972  Alper et al. .............................. 106/57

*Primary Examiner*—J. Poer
*Attorney, Agent, or Firm*—Watson, Cole, Grindle & Watson

[57] ABSTRACT

The invention relates to beads used for crushing or dispersion which are formed by fusion, conversion into beads and solidification of an appropriate batch consisting essentially, on the oxide basis, of up to 85% by weight of $ZrO_2$, a proportion of $SiO_2$ such that the weight ratio $ZrO_2/SiO_2$ is greater than or equal to 1.5, an optional proportion of $Al_2O_3$ such that the weight ratio $Al_2O_3/SiO_2$ is 0 to 1.5 and an optional proportion of $Na_2O$ such that the weight ratio $Na_2O/SiO_2$ is from 0 to 0.04, the batch also containing at least one of the additional oxides of MgO and CaO in proportions such that the weight ratio $MgO/SiO_2$ is from 0.03 to 1 and the ratio $CaO/SiO_2$ is from 0.03 to 1.45.

7 Claims, 3 Drawing Figures

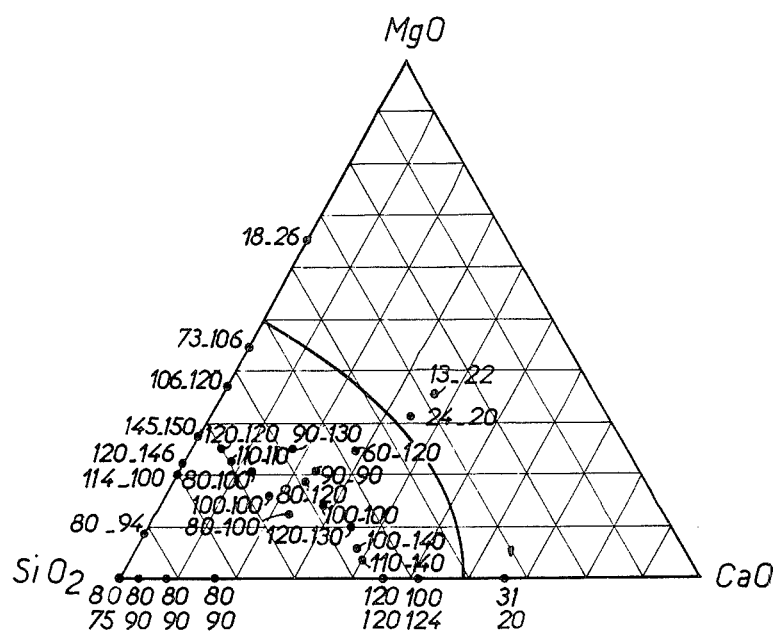
FIG.: 1

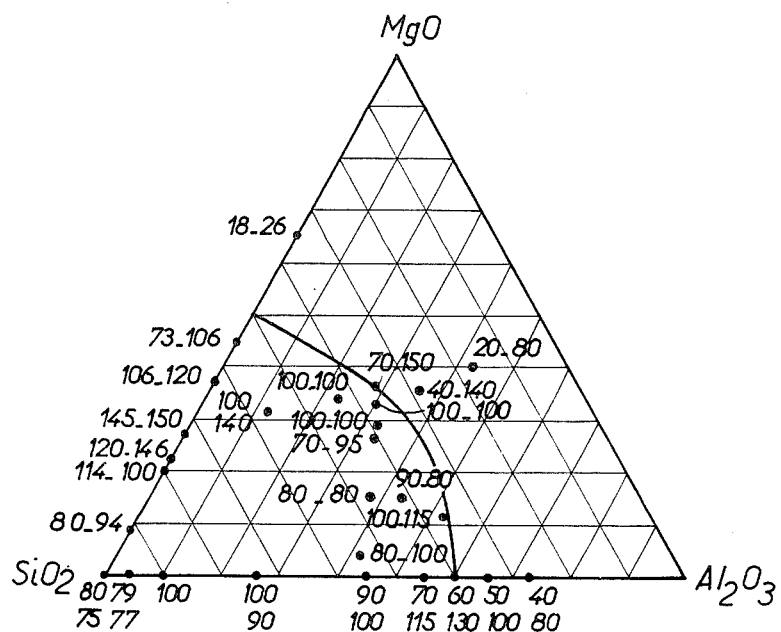
FIG.: 2
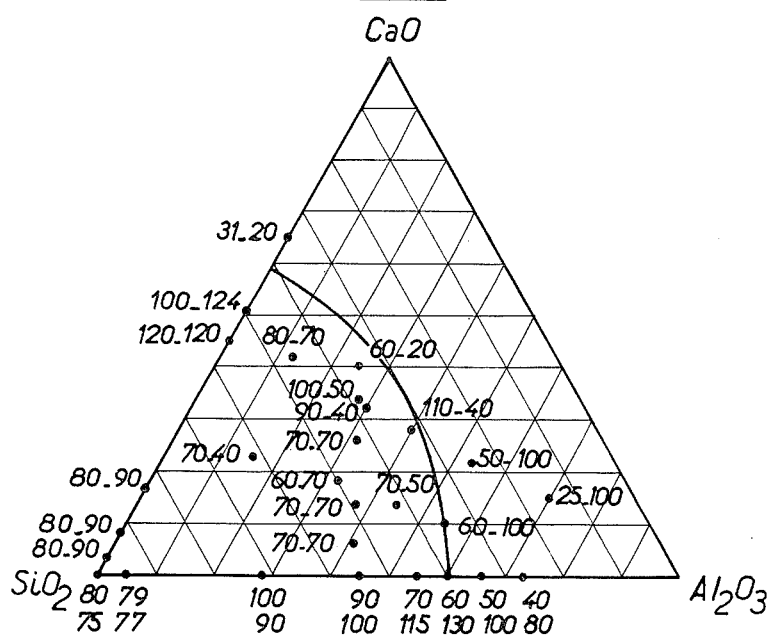
FIG.: 3

BEADS OF CERAMIC MATERIAL

BACKGROUND OF THE INVENTION

1. Field of the Invention

The present invention relates to beads or small balls of ceramic material for use inter alia in methods and devices for micro-crushing and for producing a dispersion in a moist medium.

2. Description of the Prior Art

In recent years there has been a spectacular development in devices and methods for micro-crushing and for producing a dispersion in a moist medium. The devices (bead-mills) and methods use dispersing or crushing agents which are spherical and have a small diameter (e.g. 0.4 to 4 mm) and are used, e.g., to disperse the constituents of paints, varnishes, inks or the like introduced in liquid or solid form, or to micronise a powder in a moist medium, the powder having been pre-crushed by conventional methods (e.g. in a ball-mill).

Briefly, dispersion or crushing agents must have the following properties:

Mechanical resistance to crushing and impacts;
Resistance to abrasion; and
A particle size suitable for the application.

In addition, a high density and the property of not coloring the processed products are important in certain applications, e.g., in the treatment of slips or very viscous mixtures in the first case and the treatment of white paints or powders in the second case.

The original dispersing agent used in these devices and methods was sand, e.g., Ottawa sand having round grains. If this natural product is used, however, the devices are not as efficient as they might be, since it is available only within a limited range of particle sizes (0.4–0.8mm) and its resistance to abrasion is relatively low, which limits its use to the treatment of relatively soft powder. Attempts have therefore been made to develop dispersing or crushing agents which are more suited to requirements than sand is. For example, glass beads and sintered ceramic beads are at present commercially available.

Glass beads are available within a wide range of diameters and give satisfactory results when the substances processed are not very abrasive. However, they have little resistance to abrasion and have relatively low density (approx. 2.6), and are therefore unsuitable for processing excessively viscous or abrasive products. They also have low resistance to impact and are progressively destroyed by flaking or even splitting. New beads have good resistance to crushing, but during use this property is rapidly lost as a result of microscopic fissures, scratches or surface splitting.

Beads of ceramics sintered at high temperature, more particularly titanium dioxide or alumina, have better resistance to abrasion than glass beads, but the resistance is still limited by the quality of sintering, i.e., the quality of the intercrystalline bonds. The method of manufacturing these sintered beads is still secret.

There is thus a need for beads having further improved properties.

U.S. Pat. No. 2,924,533 discloses spherical particles made of crystalline zirconium dioxide with or without crystalline mullite embedded in a vitreous silica-containing material containing, by weight, 22.5–75% zirconium dioxide, 22.5–55% silica and 0–22.5% alumina and having good mechanical strength. These particles are described as of use as blasting agents (sanding).

The invention relates to higher-quality ceramic beads for use inter alia as dispersion or crushing agents.

SUMMARY OF THE INVENTION

The invention relates to beads of ceramic material obtained by fusion, conversion into beads and solidification of appropriate batch consisting essentially, on the oxide basis, of up to 85% by weight of $ZrO_2$, a proportion of $SiO_2$ such that the weight ratio $ZrO_2/SiO_2$ is greater than or equal to 1.5, an optional proportion of $Al_2O_3$ such that the weight ratio $Al_2O_3/SiO_2$ is 0 to 1.5, and an optional proportion of $Na_2O$ such that the weight ratio $Na_2O/SiO_2$ is from 0 to 0.04, the batch also containing at least one of the additional oxides MgO and CaO in proportions such that the weight ratio $MgO/SiO_2$ is from 0.03 to 1 and the ratio by weight $CaO/SiO_2$ is from 0.03 to 1.45.

Usually the $ZrO_2$ content is at least about 23%.

It has unexpectedly been found that the presence of at least one of the additional oxides MgO and CaO considerably improves the properties of beads containing zirconium dioxide, silica and, optionally, alumina, compared with beads not containing such additional oxides, such as the beads disclosed in U.S. Patent 2,924,533.

BRIEF DESCRIPTION OF THE DRAWINGS

FIG. 1 is a ternary diagram of the system $SiO_2$—MgO—CaO.

FIG. 2 is a ternary diagram of the system $SiO_2$—MgO—$Al_2O_3$.

FIG. 3 is a ternary diagram of the system $SiO_2$—CaO—$Al_2O_3$.

The expression "consisting essentially" should be understood as meaning that ingredients other than these specified can be present in the batch as long as they do not materially affect the desirable properties of the final beads. Such unmentioned ingredients can be, in particular, impurities present in the raw materials forming the batch or ingredients which are volatilized during the melting of the batch.

The manufacture of beads according to the invention does not present special difficulties. The starting batch, comprising the aforementioned oxides or precursors thereof, can be melted in an electric furnace or other fusion device well-known to the skilled artisan. The molten material can be converted into beads by blowing a jet of molten material (e.g. with air or steam) and thus dispersing it into a number of particles which assume spherical form owing to viscosity and surface tension. Methods of this kind are conventionally used for manufacturing commercial glass beads (see e.g. U.S. Pat. No. 3,499,745). Beads having a diameter between a few tenths of a mm and 4 mm can be produced in this way.

After cooling, the spherical particles or beads according to the invention are made up of round, non-overlapping crystals of zirconium dioxide embedded in a vitreous material formed from silica and the MgO, CaO, $Al_2O_3$ and $Na_2O$ present.

The beads according to the invention are substantially solid (free from central cavities and microscopic fissures) and very resistant to abrasion and crushing, owing to the hardness of the constituent phases (zirconium dioxide and silica glass improved by additions) and the excellent cohesion due to the glass, which very efficiently "wets" the zirconium dioxide crystals. The beads have been found very useful inter alia in dispersion and micro-crushing operations.

Before studying the influence of optional and additional oxides on the properties of beads according to the invention we shall set out the test methods used during this research.

Examination of polished cross-sections

A few grams of beads are embedded in a thermo-setting resin. The resulting small test-piece is milled along a plane so as to obtain bead cross-sections. This treatment is sufficient to observe the porosity, shrinkage pipes and cracks, if any. In order to observe the crystalline texture, however, it is preferable to polish the cross-sections, e.g. with diamond paste.

Analysis of phases with X-rays

This study is very important for following the effect of adding additional oxides, since the appearance of new crystalline phases may explain important variations in the bead characteristics.

Resistance to crushing

For each bead composition, 20 beads are selected for their sphericity and are individually given crushing tests between the two pistons of a press. For the purpose of comparison, the test is always made on beads having the same diameter, i.e. 2 mm. The crushing strength is the average of the 20 results obtained.

Tests under industrial conditions have shown that for most applications the average resistance to crushing E must be greater than or equal to 60 kg per 2-mm bead. With beads having a crushing resistance below this value, breakage is considerable and the beads are practically useless.

Resistance to abrasion

The resistance to abrasion is determined on a cast plate having the same composition as the beads. A test is made on the skin (external surface) and the cast plate is sufficiently thin (6 mm) for its texture to be substantially identical with that of the beads.

A metal mask about 30 mm in diameter bounds the abraded surface in constant manner. 1 kg of brown corundum (particle size 0.4–0.6 mm) is sprayed from a sanding gum at an angle of 45⁰ with respect to the plate, which is placed at 150 mm from the gun nozzle orifice. The pressure of the air supplying the gun is 2.5 kg/cm².

The plate is weighed before and after the test and the volume abraded ($\Delta V$) is calculated.

An identical test is made on a standard plate made of a commercial refractory electro-melted material ($ZrO_2$ = 32%, $SiO_2$ = 16%, $Al_2O_3$ = 51% and $Na_2O$ = 1% by weight; E.R. 1681 material sold by the applicant), which is arbitrarily given the index 100. This standard material, which has long been used for its resistance to abrasion, is not part of the invention.

When bead are prepared from this material, their structure is poor (i.e. overlapping crystals, microscopic pipes and microscopic cracks), and their resistance to crushing is too low (less than 60 kg). The abrasion resistance I of the tested material is calculated from the formula:

$$I = \frac{\Delta V_{E.R.\ 1681}}{\Delta V^{tested\ material}} \times 100$$

Hereinafter, all the percentages are by weight.

Beads made of $SiO_2$ and $ZrO_2$ alone (not according to the invention)

In the case of $SiO_2$ < 10%, melting in an arc furnace does not raise any insurmountable problem, but the casting temperature is very high (>2500° C) and it is difficult to maintain a uniform liquid jet, which is a prerequisite for good granulation. The casting lip frequently becomes frequently plugged and the granules are very irregular.

In the case of $SiO_2$ > 50%, melting becomes increasingly difficult, since the increase in the silica content is accompanied by a decrease in the electric conductivity of the bath and progressively higher operating temperatures are required. During casting, the product is particularly viscous and tends to form fibres. The granulation output is very poor.

In the case of $10 \leq SiO_2 \leq 50\%$, the melting and granulating conditions are acceptable, but of course are better in proportion to the distance from the limits. Characteristics of beads obtained by fusion and granulation of $ZrO_2$-$SiO_2$ compositions with $10\% \leq SiO_2 \leq 50\%$:

Density: the density increases in linear manner from 3.10 for $SiO_2$ = 50% to 4.8 for $SiO_2$ = 10%.

Examination of polished cross-section $10 < SiO_2 < 15\%$: Slight tendency to a residual central shrinkage pipe and the presence of microscopic cracks $15 \leq SiO_2 \leq 40\%$: Solid beads of very good appearance. Regular texture of rounded $ZrO_2$ crystals in a $SiO_2$ glass $SiO_2 > 40\%$: Texture becoming increasingly heterogeneous with the content of $SiO_2$: stratification of large areas of silica glass with microscopic fissures or cleavages.

Resistance to crushing

The following Table gives the resistance to crushing for different $SiO_2$ contents.

| $SiO_2$, % | E |
|---|---|
| 10 | 40 kg/2 mm-diameter bead |
| 15 | 60 Kg/2 mm-diameter bead |
| 20 | 65 kg/2 mm-diameter bead |
| 30 | 80 kg/2 mm-diameter bead |
| 40 | 90 kg/2 mm-diameter bead |
| 50 | 60 kg/2 mm-diameter bead |

Thus, the crushing strength is good in the cases where $SiO_2 \geq 15\%$.

Resistance to abrasion

Through the entire range, the abrasion resistance index I decreases in a linear manner when the $SiO_2$ content increases, as shown by the following table:

| $SiO_2$, % | I |
|---|---|
| 50 | 10 |
| 30 | 75 |
| 10 | 140 |

By way of example, the composition $SiO_2 = 50\%$, $ZrO_2 = 50\%$ has an abrasion index comparable with that of glass.

All results show that useful compositions are obtained when the proportion by weight of $SiO_2$ is between 15 and 40% and the corresponding proportion of $ZrO_2$ is between 85 and 60% by weight, corresponding to a ratio by weight $ZrO_2/SiO_2$ of at least 1.5.

Note that the best resistance to crushing is obtained in the range $30\% \leqq SiO_2 \leqq 40\%$ and the abrasion resistance increases with the $ZrO_2$ content but is very good through the entire range.

In short, the compositions in which $30\% < SiO_2 = 40\%$
$60\% \leqq ZrO_2 \leqq 70\%$    ($ZrO_2/SiO_2$ varying from 1.5 to 2.33)

are preferred owing to:
ease of manufacture,
compactness and absence of microscopic cracks
good resistance to crushing, and
good resistance to abrasion.

Note that all these compositions can be obtained from natural zircon sand ($SiO_2.ZrO_2$) containing approx. $ZrO_2 = 66\%$, $SiO_2 = 33\%$ (+ impurities). The use of zircon sand as a raw material in the manufacture of beads according to the invention is very advantageous economically and constitutes a preferred embodiment.

In the case where $SiO_2$ is required to be > 33%, it is sufficient to add the appropriate quantity of silica sand to the batch to be melted.

In the case where $SiO_2$ is required to be < 33%, it is known that if zircon is melted under reducing conditions (e.g. by adding wood carbon), some or all of the silica can be eliminated by the reaction:

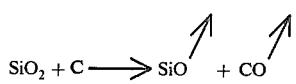

$SiO_2 + C \longrightarrow SiO\uparrow + CO\uparrow$

By operating under controlled conditions, therefore, the proportion of silica can be reduced. This method is much more economic than adding $ZrO_2$, which is very expensive.

The effect of optional oxides and additional oxides

The effect of optional oxides and additional oxides was studied on a basic composition containing approx. 33% $SiO_2$ and approx. 66% of $ZrO_2$ ($ZrO_2/SiO_2 = 2$), i.e. natural zircon sand, because the last-mentioned substance is the raw material supplying the cheapest zirconium dioxide. The proportion of optional oxides and additional oxides are shown in the form of the weight ratio:

$$\frac{\text{Optional oxide or additional oxide}}{SiO_2}$$

The proportions of optional or additional oxides $$\text{(in the form of the weight ratio} \frac{\text{optional or additional oxide}}{SiO_2}\text{)}$$

indicated in the case of zircon sand are also valid for the other compositions according to the invention, since these oxides only modify the nature of the vitreous material.

The effect of alkali-metal oxides

The addition of alkali-metal oxides results in greater fluidity of the molten mixture. The beads are solid but increasingly small. The casting temperatures are lower but still high (2000° C for an addition of 10% by weight).

We mainly studied the effects of adding $Na_2O$, which is the most important substance economically. The other alkali-metal oxide ($K_2O$ and particularly $Li_2O$) are expensive and their use is not justified unless the improvement is spectacular. This is not the case, however, as shown by results obtained with $Na_2O$ and sampling with $K_2O$ and $Li_2O$.

It is also known that alkali-metal fluxes associated with silica give glass which easily deteriorates and more particularly has a poor resistance to water and to atmospheric and chemical agents. Clearly, this glass will deteriorate even more quickly if abraded.

The addition of alkali-metal substance does not improve the bead characteristics. The resistance to crushing, impact and abrasion decreases and becomes unacceptable at a weight ratio $Na_2O/SiO_2 > 0.2$.

Small additions corresponding to a ratio $Na_2O/SiO_2 \leqq 0.04$ have only a slight influence on the caracteristics but appreciably facilitate melting of the most siliceous product.

Note that losses of $Na_2O$ through volatilisation are very important during fusion, so that the $Na_2O$ content in the produced beads can be smaller than in the starting batch.

The effect of $Al_2O_3$

The range $0 < Al_2O_3/SiO_2 < 2.7$ was scanned.

The external appearance of the beads is very good for all these compositions. The polished surface does not show any marked tendency to residual shrinkage pipes or cracks. X-ray analysis shows that monoclinic zirconium dioxide is the only crystalline phase. However, mullite lines appear in the case where $Al_2O_3/SiO_2 > 1.5$.

Resistance to crushing

This increases very rapidly and reaches 100 kg after the addition of a small amount of alumina corresponding to the ratio $Al_2O_3/SiO_2 = 0.1$, and then remains almost constant up to $Al_2O_3/SiO_2 = 0.6$. It then slowly decreases but remains greater than 80 kg up to $Al_2O_3/SiO_2 = 1$. Beyond this, it decreases to below 60 kg for $Al_2O_3/SiO_2 = 1.5$.

Abrasion index

This increases up to $Al_2O_3/SiO_2 = 1.5$ (I = 130), then decreases: I = 80 for $Al_2O_3/SiO_2 = 2.7$.

In conclusion, the addition of alumina to $SiO_2$-$ZrO_2$ mixtures improve the bead characteristics for $Al_2O_3/SiO_2 \leqq 1.5$.

The best characteristics are obtained for $0.1 < Al_2O_3/SiO_2 < 1$.

E = 100 kg/2-mm diameter bead
I = 100

Effect of MgO

The range $0.03 < MgO/SiO_2 < 1.86$ was scanned. Throughout this range, regular beads were obtained having a good external appearance.

In the case of $MgO/SiO_2 \leqq 1$, examination of polished surfaces shows that the beads are solid, without cracks and with a very fine texture.

X-rays analysis shows that the main phase is monoclinic zirconium dioxide with a small amount of cubic zirconium dioxide. The magnesium silicate is amorphous.

In the case where $MgO/SiO_2 > 1$, a central shrinkage pipe appears and increases with the ratio $MgO/SiO_2$. This fault is apparently connected with the formation of forsterite (2 $MgO.SiO_2$) which precipitates at high temperature. This compound has been detected by radiocrystallographic analysis and its concentration appears to be related with the size of the shrinkage pipe.

Resistance to crushing

The resistance to crushing increases with the weight ratio $MgO/SiO_2$. It passes through a maximum for $MgO/SiO_2 = 0.4$, then decreases.

In the case where $MgO/SiO_2 \leqq 0.77$, E > 80 kg/2 mm diameter bead, i.e. the same as for zircon beads without addition.

In the case where $MgO/SiO_2 > 1$, this characteristic becomes unacceptable (< 60 kg per 2-mm diameter bead).

Abrasion index

The abrasion index increases with $MgO/SiO_2$, reaching a maximum of 150 when the ratio is 0.4. It then decreases, but remains better than for compositions without additions, up to $MgO/SiO_2 = 1$. In short, the addition of MgO to $SiO_2$-$ZrO_2$ mixtures improves the bead characteristics in the case where $Mgo/SiO_2 \leqq 1$.

The best characteristics are obtained when $MgO/SiO_2$ is approximately 0.4, i.e.

E = 145 kg/2-mm diameter bead, and
I = 150.

Effect of CaO

The range $0.03 < CaO/SiO_2 < 1.90$ was scanned.

Throughout this range, the beads obtained were regular and had a good external appearance.

Examination of polished cross-sections showed that the beads were solid, without cracks and contained fine zirconium dioxide crystals up to $CaO/SiO_2 = 1.5$.

Below this value, shrinkage pipes begin to appear and increase when the ratio increases.

X-ray analysis shows that this fault corresponds to the presence of $CaO.ZrO_2$ and crystalline silicates.

These results were confirmed by studying the characteristics of the resulting beads.

Resistance to crushing

This increases with the $CaO/SiO_2$ ratio, passing through a maximum (120 kg/bead) for $CaO/SiO_2 = 0.82$. It then decreases and becomes unacceptable (< 60 kg) for $CaO/SiO_2 = 1.45$. In the case where $CaO/SiO_2 \leqq 1.21$, E > 80 kg (the resistance of zircon beads without additions).

Abrasion index

It increases up to $CaO/SiO_2 = 1.1$ (I = 124) then begins to decrease, but remains greater than 75 for a $CaO/SiO_2$ ratio $\leqq 1.45$.

In conclusion, the addition of CaO to molten mixtures of $SiO_2$ and $ZrO_2$ improves the bead characteristics for $CaO/SiO_2 = 1.45$.

The best results are obtained for a weight ratio $CaO/SiO_2 \sim 0.82$, i.e.

E = 120 kg/2-mm diameter bead, and
I = 120.

The effect of adding two or more optional and additional oxides

As before, the effect was studied by adding optional and/or additional oxides to a basic composition comprising natural zircon sand (33% $SiO_2$ and 66% zirconium dioxide approximately).

Since the optional and additional oxides only modify the vitreous material, the results obtained with the systems $SiO_2$ — MgO — CaO, $SiO_2$ — MgO — $Al_2O_3$ and $SiO_2$ — CaO — $Al_2O_3$ have been shown in the accompanying FIGS. 1, 2 and 3, which are ternary diagrams of these systems, which make up the vitreous phase of the beads according to the invention.

The important regions in these diagrams are to the left of the continuous curve. The important regions of the systems $SiO_2$ — MgO — $Al_2O_3$ and $SiO_2$ — CaO — $Al_2O_3$ are superposable on their most part, so that the conclusions remain valid for the system $SiO_2$ — $Al_2O_3$ — (CaO + MgO) within the same limits, i.e. for a given composition a part of the CaO or MgO can be replaced by MgO or CaO, respectively. These diagrams also show the results obtained with compositions containing only one optional or additional oxide (points on the sides of the ternary-diagram triangle). On the diagrams, the first and the second Figures associated with each indicated composition denote the resistance to crushing and the resistance to abrasion thereof, respectively.

The additions to zircon sand (33% $ZrO_2$–66% zirconium dioxide) result in an increase in the proportion of the vitreous binding matrix, which is the least hard phase in the beads according to the invention. In spite of this, there is a very marked improvement in the resistance to crushing and abrasion. This is due to the improvement in the mechanical characteristics of the thus-formed vitreous matrices.

Similarly, compositions having a higher content of zirconium dioxide bonded by the best vitreous matrices disclosed hereinbefore, will have greatly improved characteristics, more particularly a very high resistance to abrasion. We shall now give some examples of compositions having a high zirconium dioxide content modified by additional oxides which are useful in manufacturing bead according to the invention, with their crushing and abrasion resistances.

| Composition A | $ZrO_2$ = 79% by weight<br>$SiO_2$ = 15% by weight<br>MgO = 6% by weight | E = 150<br>I = 200 |
|---|---|---|
| Composition B | $ZrO_2$ = 76% by weight<br>$SiO_2$ = 12% by weight<br>CaO = 12% by weight | E = 130<br>I = 160 |

-continued

| Composition C | ZrO$_2$ = 74% by weight | E = 150 |
| | SiO$_2$ = 7% by weight | |
| | Al$_2$O$_3$ = 10% by weight | |
| | CaO = 6% by weight | I = 300 |
| | MgO = 3% by weight | |

We claim:

1. Beads of ceramic material having a diameter of between about a few tenths of a mm and about 4 mm obtained by fusion, conversion into beads and solidification of a starting batch consisting, on the oxide basis, of up to 85% by weight of ZrO$_2$, a proportion of SiO$_2$ such that the weight ratio ZrO$_2$/SiO$_2$ is greater than or equal to 1.5, an optional proportion of Al$_2$O$_3$ such that the weight ratio Al$_2$O$_3$/SiO$_2$ is 0 to 1.5 and an optional proportion of Na$_2$O such that the weight ratio Na$_2$O/SiO$_2$ is from 0 to 0.04, the starting batch also containing at least one of the additional oxides MgO and CaO in proportions such that the weight ratio MgO/SiO$_2$ is from 0.03 to 1 and the weight ratio CaO/SiO$_2$ is from 0.03 to 1.45.

2. Beads according to claim 1, wherein the weight ratio ZrO$_2$/SiO$_2$ is between 1.5 and 2.33.

3. Beads according to claim 2, wherein the weight ratio MgO/SiO$_2$ is between 0.03 and 0.77, the weight ratio CaO/SiO$_2$ is between 0.03 and 1.21, the weight ratio Al$_2$O$_3$/SiO$_2$ is between 0 and 1 and the weight ratio Na$_2$O/SiO$_2$ is between 0 and 0.04.

4. Beads according to claim 2, wherein the weight ratio ZrO$_2$/SiO$_2$ is equal to approximately 2.

5. Beads according to claim 2, wherein the weight ratio MgO/SiO$_2$ is approximately 0.4.

6. Beads according to claim 2, wherein the weight ratio CaO/SiO$_2$ is approximately 0.82.

7. Beads according to claim 2, wherein the weight ratio Al$_2$O$_3$/SiO$_2$ is between 0.1 and 1.

* * * * *